Nov. 13, 1956 P. REKETTYE 2,770,213
BALL STRIPING APPARATUS
Filed July 27, 1955 4 Sheets-Sheet 1

INVENTOR
PAUL REKETTYE
BY *Ely, Frye & Hamilton*
ATTORNEYS

Nov. 13, 1956    P. REKETTYE    2,770,213
BALL STRIPING APPARATUS
Filed July 27, 1955    4 Sheets-Sheet 2

*INVENTOR.*
PAUL REKETTYE
BY 
ATTORNEYS

Nov. 13, 1956 P. REKETTYE 2,770,213
BALL STRIPING APPARATUS
Filed July 27, 1955 4 Sheets—Sheet 3
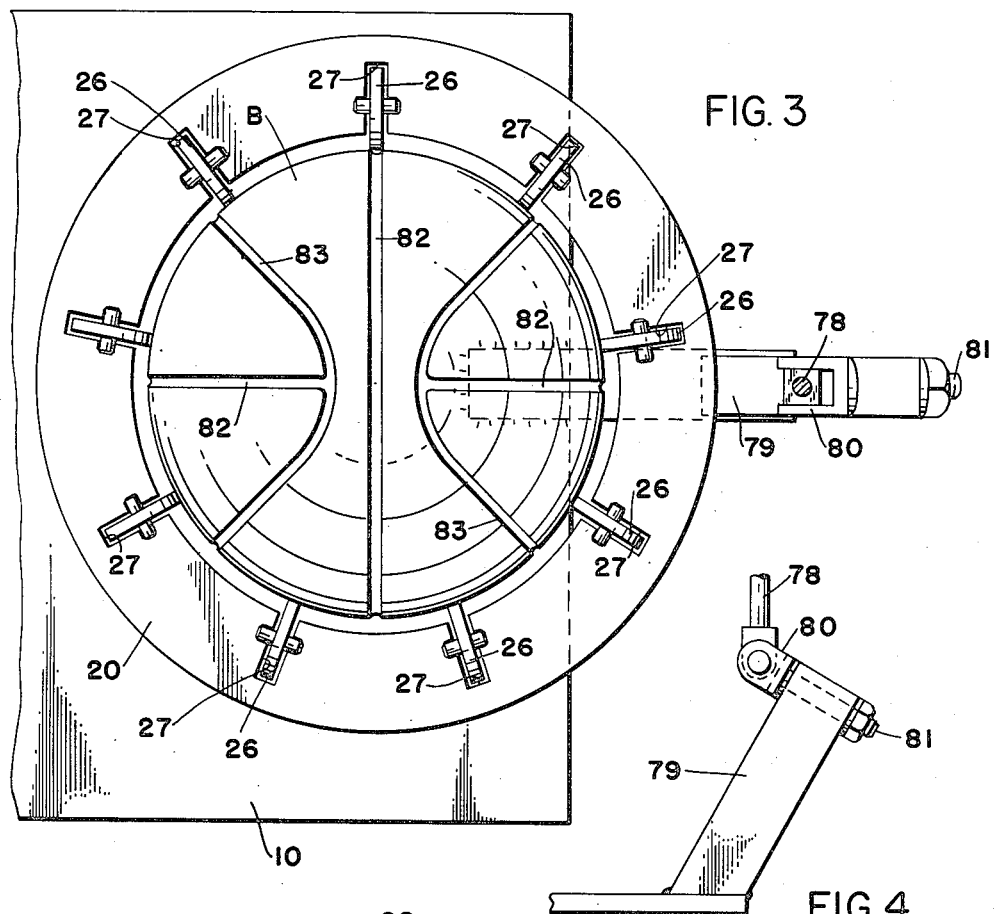
FIG. 3
FIG. 4
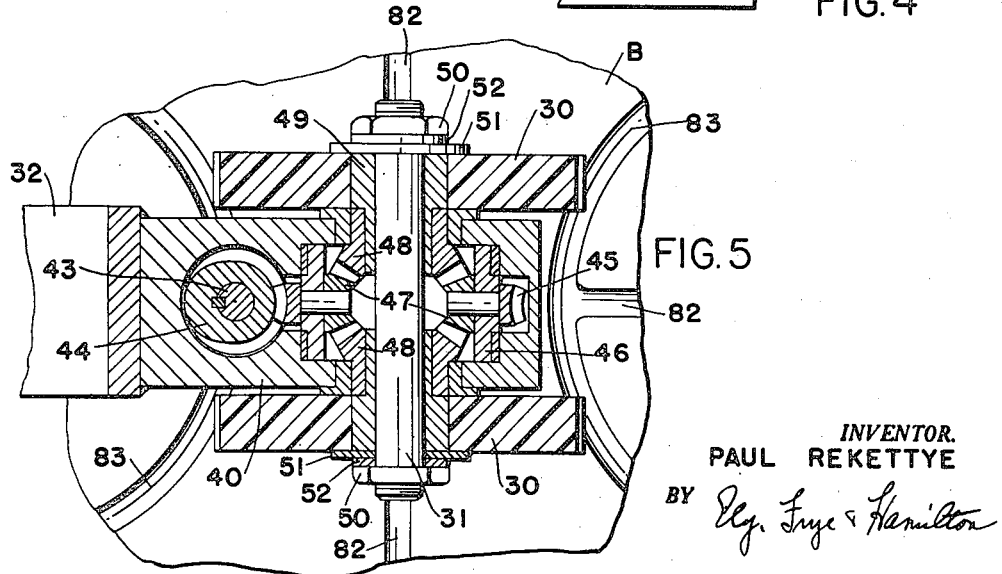
FIG. 5
INVENTOR.
PAUL REKETTYE
BY
ATTORNEYS Nov. 13, 1956 P. REKETTYE 2,770,213
BALL STRIPING APPARATUS
Filed July 27, 1955 4 Sheets—Sheet 4
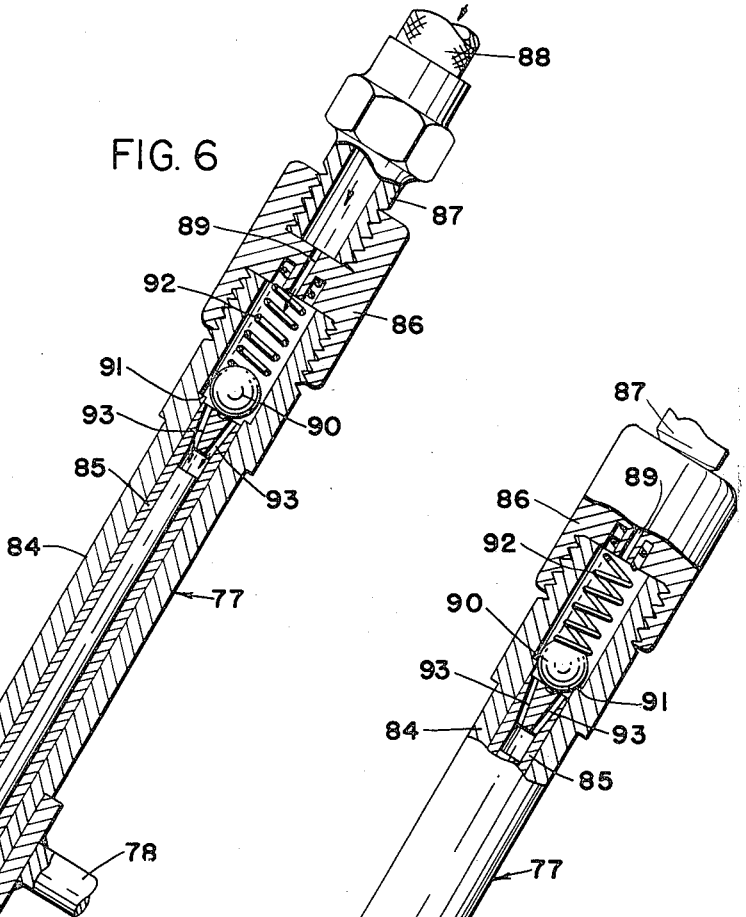
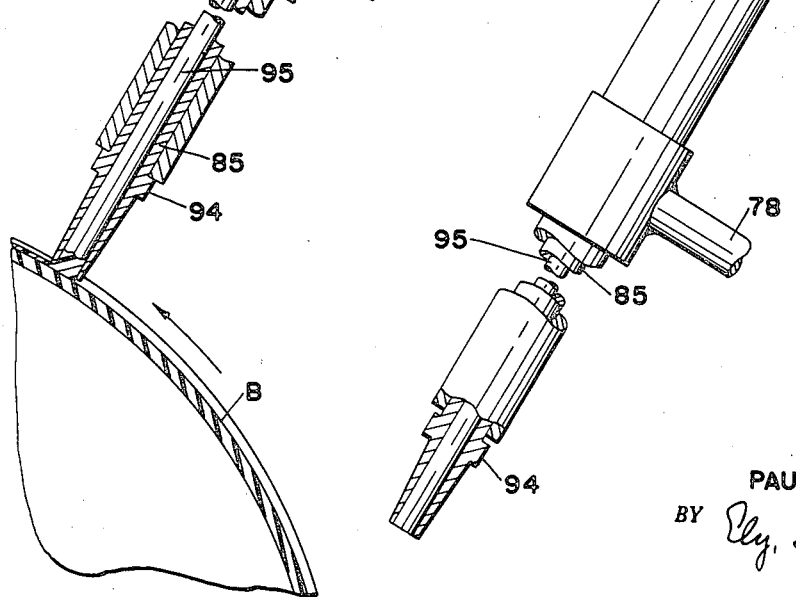
INVENTOR.
PAUL REKETTYE
BY Ely, Frye & Hamilton
ATTORNEYS United States Patent Office 2,770,213
Patented Nov. 13, 1956

2,770,213

BALL STRIPING APPARATUS

Paul Rekettye, Akron, Ohio, assignor to The Sun Rubber Company, Barberton, Ohio, a corporation of Ohio Application July 27, 1955, Serial No. 524,759

12 Claims. (Cl. 118—76)

The invention relates to mechanism for applying colored stripes to the spherical surfaces of balls used for recreation or sports, such as basketballs. Large quantities of these balls are manufactured out of rubber or plastic materials and their outer surfaces provided with curved stripes in a desired design or pattern, including some stripes which change direction as they encircle the balls.

The balls are preferably molded with exterior grooves following the desired pattern, and the conventional method of applying the striping is to color the grooves by hand with a dark colored or black crayon pencil, after which the balls are spray coated with a non-hardening plastic coating which improves the appearance and feel of the ball and also protects the striping.

Striping the balls by hand is an awkward and laborious operation because the operator holds the crayon in one hand and attempts to turn the ball while supporting it in the other hand, to follow curved paths which change direction and to continuously keep uppermost that portion of the ball which is being marked. Moreover, substantial pressure must be exerted on the crayon to produce a stripe which is heavy and black, with the result that the lead of the crayon breaks constantly. The practice of freezing the point of the lead has been resorted to, to decrease the breakage of leads, but this is far from satisfactory and requires keeping a large supply of crayons with their points resting on dry ice or the like, and constantly changing crayons.

The present invention has for its primary object the provision of a novel and improved apparatus for supporting and turning a ball about one axis in relation to a marking implement such as a crayon lead having its point laterally supported and held in contact with the ball under constant pressure, said apparatus having means for simultaneously turning the ball about another axis to cause the crayon point accurately to follow a desired path of changing direction on the surface of the ball.

Other objects include the provision of novel means for rotating the ball by surface contact, and means for selectively moving the rotating means away from the ball.

The present improved apparatus overcomes the disadvantages of the conventional hand method of striping balls, and is simple and inexpensive to construct and easy to operate. A preferred embodiment of the apparatus is shown by way of example in the accompanying drawings and described in detail herein. Various modifications and changes in details of construction are included within the scope of the appended claims defining the invention.

The embodiment illustrated and described includes a turntable frame having a horizontal circumferential series of rollers contacting the ball and means for rotating the turntable to rotate the ball on its vertical axis, with bottom rollers supporting the ball for rotation on a horizontal diameter, a pair of laterally spaced drive wheels resting on top of the ball for rotating the ball on said horizontal diameter, and means for holding a crayon lead or stick in contact with the exterior surface of the ball under constant uniform pressure as the ball is marked.

In the drawings:

Fig. 3 is a top plan view thereof taken substantially on line 3—3 of Fig. 1.

Fig. 4 is a fragmentary side elevation similar to Fig. 1, showing a portion of the support for the crayon holder.

Fig. 5 is an enlarged fragmentary sectional view taken substantially on line 5—5 of Fig. 1.

Fig. 6 is an enlarged longitudinal sectional view of the crayon holding and feeding mechanism with the crayon lead in contact with the ball surface.

Fig. 7 is a similar view, partly in elevation, with the lead out of contact with the ball.

Figure 1:
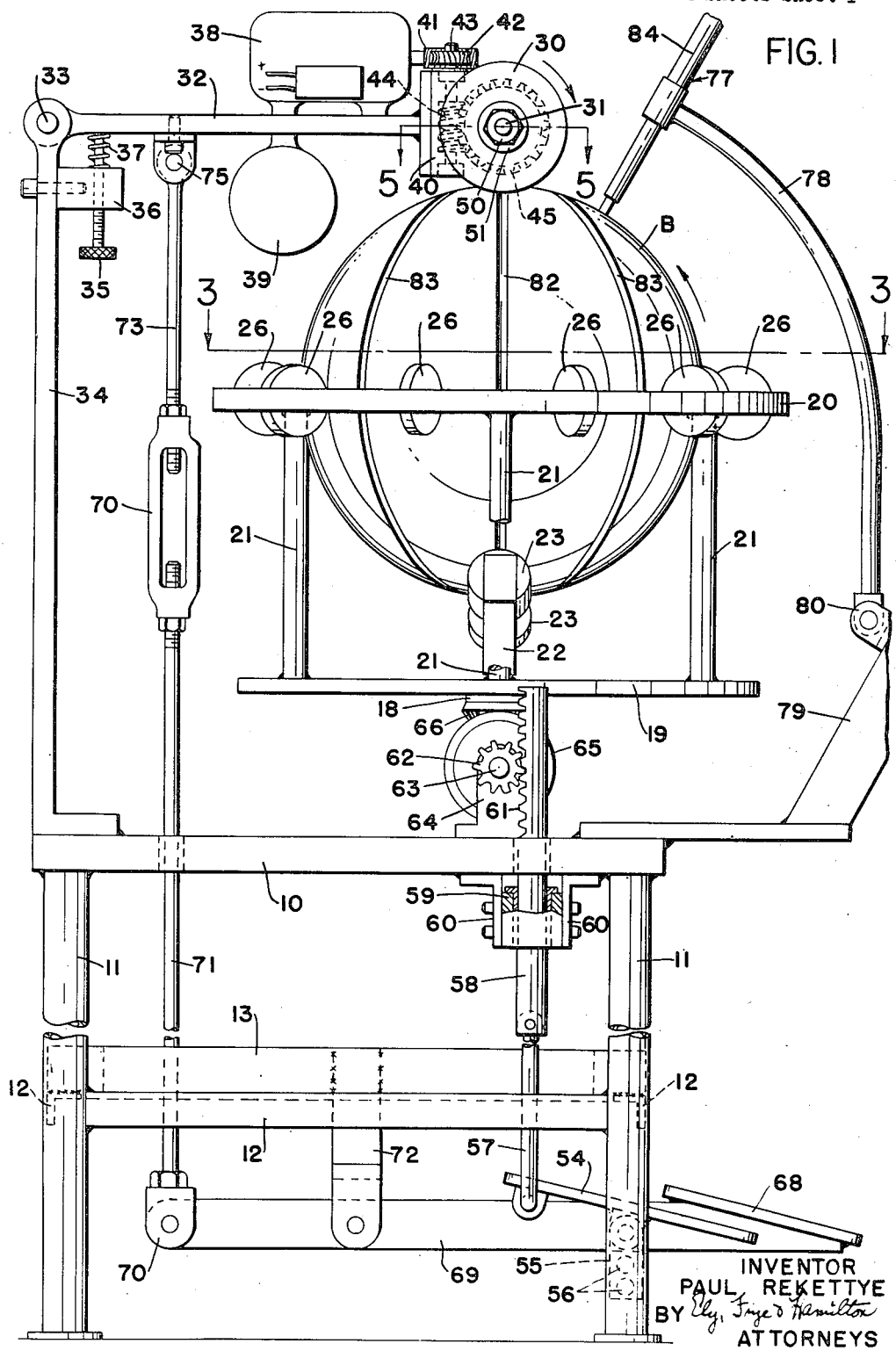
Fig. 1 is a side elevation of the improved apparatus, part of the support for the crayon holder being broken away.

The apparatus preferably includes a rectangular base plate 10 supported by vertical legs 11 resting on the floor and secured, as by welding, at their upper ends to the corners of the plate. Horizontal angles 12 extend between the legs intermediate their ends, the ends of the angles being welded to the legs. Midway of the front and rear legs and extending from front to rear across the tops of front and rear angles 12 are two laterally spaced parallel bars 13 welded on edge to the tops of said angles. These bars serve as a support and a guideway for pedal operators, as will hereinafter be described.

A column or center post 14 for the turntable is supported on the forward part of base plate 10 substantially midway of the corners, the base 15 of the column being preferably welded to the plate 10. The upper portion 16 of the column is reduced in diameter to form an annular shoulder 17, and a flanged bushing 18 rests on the shoulder and is journaled on the reduced portion 16 of the column. The flanged upper end of the bushing 18 is welded to and supports the bottom plate 19 of a turntable frame having an upper horizontal ring 20 supported on the plate 19 by posts 21.

Figure 2:
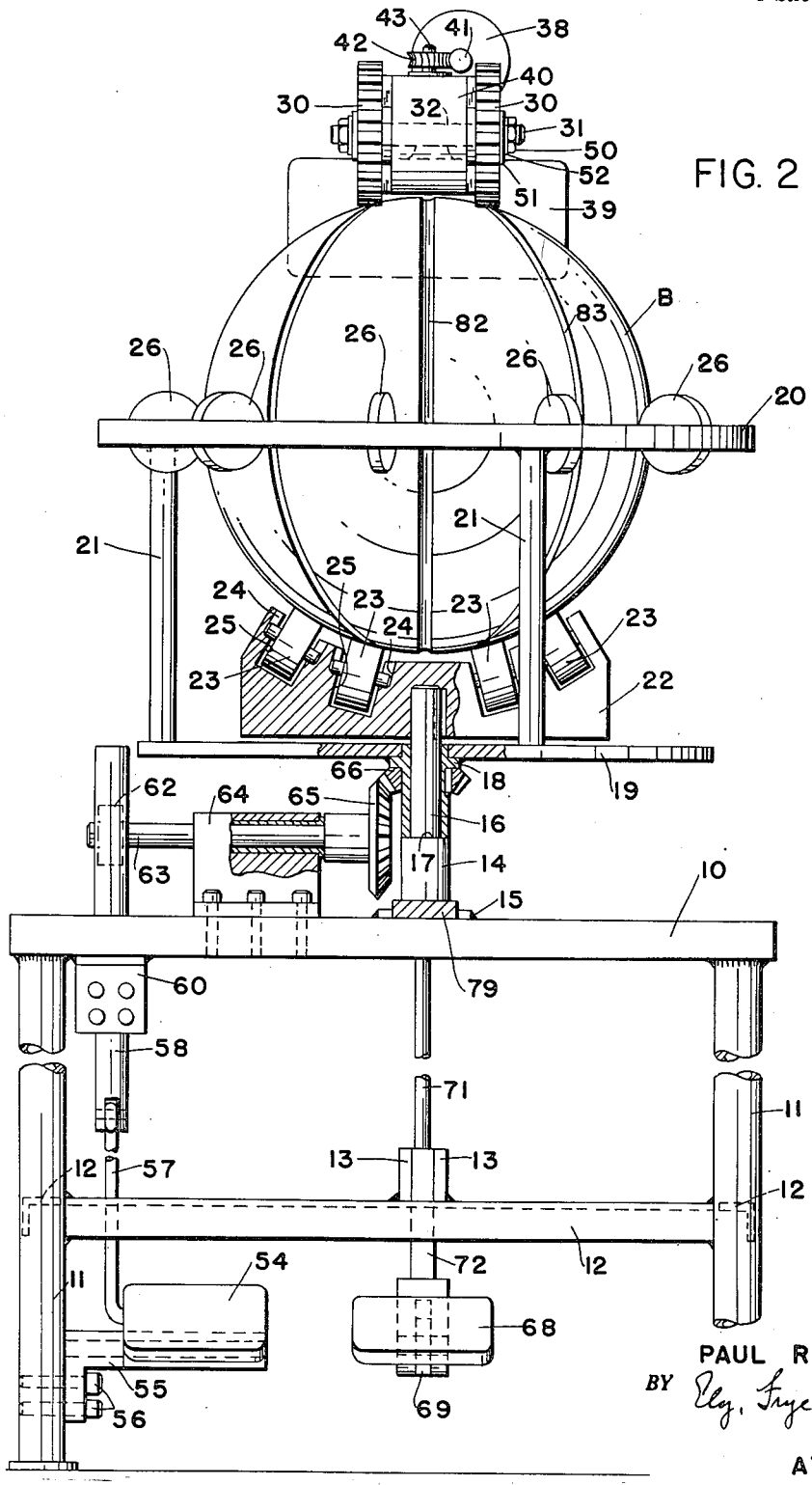
Fig. 2 is a front elevation thereof with parts in section.
Figure 2:

The upper end of the column portion 16 projects above the plate 19 and has keyed thereon a laterally extending roller supporting bracket 22, the bottom edge of which is spaced slightly above the plate 19, as shown in Fig. 2. The top of the bracket 22 is slotted to receive a series of rollers 23 arranged arcuately on a radius of a ball B supported thereon within the ring 20. As shown, the roller shafts may be supported in notches 24 on opposite sides of each of the roller slots 25. If desired, the rollers 23 may be journaled on their shafts by suitable anti-friction bearings.

The horizontal upper ring has a plurality of circumferentially arranged, radially disposed rollers 26 journaled therein on horizontal axes in slots 27, and the rollers project radially inward of the slots sufficiently to contact the horizontal circumference of the ball B. Thus, the rollers 26 permit rotation of the ball B on its horizontal axis or diameter parallel to the bracket 22 carrying the rollers 23 supporting the ball. If the turntable is turned on column 14 relative to the bracket 22, the contacts of rollers 26 with the ball cause it to rotate on its vertical axis or diameter coaxial with the column 14.

The means for driving or rotating the ball on its horizontal axis preferably includes a pair of laterally spaced driving wheels 30 normally resting on top of the ball B. The axle shaft 31 of the wheels 30 is parallel to the bracket 22 so that the rotation of the ball is at right angles to the axis of the rollers 23 on which it is supported. The outer peripheries of the wheels 30 are knurled or otherwise roughened sufficiently to frictionally grip the outer surface of the ball.

The spaced wheels 30 are carried on an arm 32 which extends over the ball and is pivoted at its rear end by a horizontal pin 33 on the upper end of a vertical bracket arm 34 supported on the rear of the base plate 10. An adjustable stop screw 35 mounted in a block 36 on arm 34 limits the downward movement of arm 32, and a spring 37 between the arm 32 and block 36 cushions said downward movement.

A small electric motor 38 is mounted on arm 32 for driving the wheels 30, and a counterweight 39 may be hung below the arm for exerting sufficient pressure between the wheels 30 and the ball to insure good traction in rotating the ball. The motor 38 is operatively connected to the wheels through differential gearing in the housing 40 located between the wheels and secured to the front end of arm 32. This gearing permits one wheel to travel faster than the other, in the same manner as the differential gearing between the rear wheels of an automobile, and can be turned on its vertical axis as it is being rotated on its horizontal axis.

The motor shaft has a worm 41 which drives a worm gear 42 on a vertical shaft 43 mounted in housing 40, and the shaft 43 has a worm 44 thereon which drives a worm ring gear 45 concentric with the shaft 31 of the wheels 30. Referring to Fig. 5, the worm gear 45 is carried on the outer surface of a ring 46 rotatable in the housing 40 and having on its inner surface a plurality of bevel pinions 47, two being shown. The pinions 47 are located between and mesh with opposed bevel gears 48 secured on bushings 49 on which the wheels 30 are mounted by means of nuts 50 and washers 51 and 52 on the ends of the shaft 31.

Accordingly, when the ball is being rotated on a fixed horizontal axis passing through its horizontal diameter, the bevel pinions 47 rotating around the shaft 31 drive the bevel gears 48 and wheels 30 at the same speed. When the ball is turned on its vertical axis, it causes one wheel 30 to slow down or stop, and this is compensated for by relative movement of the pinions 47 around the gear 48 of the one wheel, while allowing driving of the other wheel 30 at constant speed.

In the embodiment of the invention shown in the drawings, a foot pedal operating device is provided for turning the ball on its vertical axis. Referring to Figs. 1 and 2 a pedal 54 is pivotally mounted intermediate its ends on a bearing bracket 55 secured to one of the front legs 11 by screws 56. The rear end of the pedal is pivoted to the lower end of a vertical link 57 which has its upper end pivoted to the bottom end of a rack bar 58 slidably mounted in a bearing 59 mounted on the bottom side of plate 10 by angle brackets 60. The portion of the rack bar projecting above base plate 10 has rack teeth 61 thereon which mesh with a pinion 62 on the outer end of a horizontal shaft 63. The shaft 63 is journaled in a bearing 64 mounted on plate 10, and the inner end of the shaft has a bevel gear 65 meshing with a bevel gear 66 keyed on the flanged bushing 18. Thus, moving the rack bar 58 up or down by pressing the front or rear of the pedal will rotate the turntable and ball around its vertical axis in opposite directions.

A second pedal 68, adapted to be actuated by the other foot of an operator facing the front of the machine, is provided centrally of the front legs 11. The pedal 68 is mounted on the front end of a lever arm 69 pivotally connected at its rear end by a clevis 70 to a link rod 71 extending upwardly between bars 13. The lever arm 69 is pivotally mounted between its ends on a bracket arm 72 secured at its upper ends to the bars 13. The link rod 71 is connected behind the ball and turntable to an upper rod 73 by a turnbuckle 74. The upper end of rod 73 is pivoted at 75 to the drive-supporting arm 32. Thus, depressing the pedal 68 will lift the arm 32 and the driving wheels above the ball B so that it can be replaced.

The improved marking implement comprising a holder for holding the end of a lead against the outer surface of the ball is indicated generally at 77. As shown in Fig. 1, it is mounted on the upper end of a curved arm 78 in front of the turntable. The lower end of arm 78 is mounted for substantially universal movement on a bracket 79 supported on the front of base plate 10. As shown in Fig. 4, the lower end of arm 78 is pivoted to a clevis 80 which is in turn pivoted on the bracket by a bolt 81 at right angles to the clevis pivot.

The holder 77 is adapted to hold the point of a crayon lead against the outer surface of the ball B in the turntable. It will be seen that by turning the turntable on its vertical axis as the ball is driven on its horizontal axis, the point of the crayon can be made to follow any desired path such as the curved grooves 82 and 83 previously formed in the ball surface. The arm 78 is easily swung away from the ball by lifting it with the fingers when changing the crayon point from one groove to another.

The holder 77 comprises a tubular barrel 84 having an inner sleeve 85 longitudinally slidable therein. The inner end of the barrel is externally threaded and a coupling 86 screwed thereon, to which is connected the thimble 87 of a low pressure air hose 88. The coupling 86 has a small axial passageway 89 for conducting the air into the end of the barrel where the pressure normally tends to hold a ball valve 90 against an annular seat 91 formed in the barrel, the ball 90 also being urged in the same direction by a helical spring 92 interposed between the ball and the partition wall of coupling 86.

The inner end of sleeve 85 is closed except for small passageways 93 communicating with the interior of the sleeve, and the ball 90 abuts the closed end between said passageway openings. The outer end of sleeve 85 projects beyond the end of the barrel, and is provided with an annular shoulder 94 beyond which the sleeve is preferably gradually tapered to its outer end. When the ball 90 is seated on seat 91 and in abutment with the closed end of sleeve 85, the outer shoulder 94 is spaced slightly beyond the outer end of the barrel 84, as shown in Fig. 7. The bore of sleeve 85 is of a diameter to snugly, yet slidably, fit a crayon lead or stick 95 of marking material. Now when the inner sleeve 85 is pushed into the barrel until shoulder 94 abuts the end of the barrel, as by contacting its outer end with the ball B as shown in Fig. 6, the abutment of the closed end of the sleeve with the ball valve 90 will lift it off its seat and allow air under pressure to enter the sleeve.

The amount of air pressure is predetermined so as to force the outer end of the crayon stick against the ball with a uniform pressure sufficient to cause it to mark the ball B as the ball is rotated, but the pressure is nevertheless so little that it projects the crayon stick beyond the tapered end a very slight distance, as indicated in Fig. 6. Accordingly, substantially all of the crayon stick is supported by the sleeve 85 during the marking operation, with the result that the stick does not break off, and expedients such as freezing the stick are not necessary. After a stick or lead is used up, it is a simple matter to insert a new one into the sleeve 85.

In using the improved apparatus, the operator sits comfortably in the front thereof, and to start depresses the foot pedal 68 to raise the drive-support arm 32. While swinging the crayon stick holder 78 away from the turntable with one hand, the operator drops a ball B into the turntable with the other hand and positions the holder 78 with its crayon stick in one of the grooves 82 or 83 on the ball. The pedal 68 is then released and the motor 38 started. As the ball B is rotated on its horizontal axis, the operator manipulates pedal 54 to rotate the ball in either direction on its vertical axis in such manner as to cause the crayon stick to follow accurately along a predetermined path on the ball surface, as may be defined by the preformed grooves 82 and 83 therein.

What is claimed is:

1. Ball striping apparatus including a base, a turntable rotatably supported on a vertical axis on the base, said turntable having a frame mounting radially disposed rollers for contacting the horizontal circumference of a ball within the frame, driving means for contacting said ball to rotate it around a horizontal diameter thereof, arcuately arranged rollers in the vertical plane of said horizontal diameter for supporting said ball on said base, means for rotating the turntable in either direction on said base, and means on said base for holding the end of a marking implement against the outer surface of said ball under constant predetermined pressure.

2. Ball striping apparatus including a base, a turntable rotatably supported on a vertical axis on the base, said turntable having a frame mounting radially disposed rollers for contacting the horizontal circumference of a ball within the frame, driving means for contacting said ball to rotate it around a horizontal diameter thereof, a roller on the base for supporting the ball by contact with the bottom thereof, means for rotating the turntable in opposite directions, and means on said base for holding the end of a marking implement against the outer surface of said ball.

3. Ball striping apparatus including a base, a turntable rotatably supported on a vertical axis on the base, said turntable having a frame mounting radially disposed rollers for contacting the horizontal circumference of a ball within the frame, driving means for contacting said ball to rotate it around a horizontal diameter thereof, arcuately arranged rollers in the vertical plane of said horizontal diameter for supporting said ball on said base, means for rotating the turntable in either direction on said base, a holder on said base for laterally supporting substantially the entire length of a crayon stick with its end against the surface of the ball, and means for applying constant predetermined endwise pressure to said crayon stick.

4. Ball striping apparatus including a base, a turntable rotatably supported on a vertical axis on the base, said turntable having a frame mounting radially disposed rollers for contacting the horizontal circumference of a ball within the frame, driving means for contacting said ball to rotate it around a horizontal diameter thereof, a roller on the base for supporting the ball by contact with the bottom thereof, means for rotating the turntable in opposite directions, a holder on said base for holding the end of a crayon stick against said ball while laterally supporting substantially its entire length, and means to apply constant predetermined pressure endwise to said crayon stick.

5. Ball striping apparatus including a base, a turntable rotatably supported on a vertical axis on said base and having a frame, means on said frame for contacting the horizontal circumference of a ball within the frame, means for rollably supporting the bottom of said ball on said base, means for holding a marking implement against the surface of said ball, and driving means for contacting the top of the ball to rotate it around a horizontal diameter thereof, said driving means comprising laterally spaced wheels for contacting said ball, and differential gearing connected to said wheels allowing them to rotate at the same or different speeds.

6. Ball striping apparatus including a base, a turntable rotatably supported on a vertical axis on said base and having a horizontal annular frame, radially disposed rollers on said frame for contacting a ball within said frame, means for rollably supporting the ball on said base, means for holding a marking implement against the surface of said ball, a pair of laterally spaced driving wheels for contacting the top of the ball, means for driving said wheels in the same direction, and differential gearing connected to said wheels whereby one of said wheels can decrease its speed as the turntable is turned to rotate the ball.

7. Ball striping apparatus including a base, a turntable rotatably supported on a vertical axis on said base and having a horizontal annular frame, radially disposed rollers on said frame for contacting a ball within said frame, a pair of laterally spaced coaxial driving wheels for contacting the top of the ball, means for driving the wheels in the same direction, differential gearing connected to said wheels whereby one of said wheels can decrease its speed as the turntable is turned to rotate the ball, and rollers in the same vertical plane as the driving wheels for supporting the bottom of said ball on said base.

8. In a ball striping apparatus including a base, a turntable rotatably supported on a vertical axis on said base and having a frame, annularly arranged support means rotatable on horizontal axes on the frame for contacting a ball within said frame, means for rollably supporting the bottom of said ball on said base, and driving means for contacting the surface of said ball to rotate it around a horizontal diameter thereof.

9. In a ball striping apparatus including a base, a turntable rotatably supported on a vertical axis on said base and having a frame, horizontally disposed means on the frame for contacting a ball within said frame, means for rollably supporting the bottom of said ball on said base, and driving means for contacting the surface of said ball to rotate it around a horizontal diameter thereof, said driving means comprising laterally spaced wheels for contacting the surface of the ball, power means, and differential gearing connecting said power means to said wheels allowing the wheels to rotate at the same or different speeds.

10. In a ball striping apparatus including a base, a turntable rotatably supported on a vertical axis on said base and having a horizontal annular frame, radially disposed rollers on said frame for contacting a ball within said frame, driving means for contacting the surface of the ball to rotate it around a horizontal diameter thereof, and arcuately arranged rollers in the same vertical plane as the driving means for supporting the bottom of the ball on said base for rotation about said horizontal diameter.

11. A device for marking a ball as it is rotated on one or more of its axes, including a tubular barrel, a sleeve longitudinally slidable in said barrel and having one end projecting from one end of the barrel, a ball valve abutting the other end of said sleeve and normally closing said barrel, a marking stick longitudinally slidable in said sleeve, and means for admitting fluid pressure to the other end of said barrel, whereby pressure on the projecting end of the sleeve will open the ball valve and apply fluid pressure to the marking stick at the other end of said sleeve.

12. A device for marking a ball as it is rotated on one or more of its axes, including a tubular barrel, a sleeve longitudinally slidable in said barrel and having one end projecting from one end of the barrel, an annular shoulder on said sleeve for abutting the end of said barrel to limit movement of the sleeve thereinto, a ball valve yieldingly abutting the other end of said sleeve within the barrel normally closing the barrel and adapted to be opened by force applied axially to the projecting end of the sleeve, a marking stick longitudinally slidable in said sleeve, and means for admitting fluid pressure to the other end of said barrel to gradually eject the marking stick from the projecting end of the sleeve.

References Cited in the file of this patent

UNITED STATES PATENTS

| | | |
|---|---|---|
| 1,919,386 | Steele | July 25, 1933 |
| 2,313,891 | Rogers et al. | Mar. 16, 1943 |
| 2,367,722 | Guthrie | Jan. 23, 1945 |
| 2,492,439 | Philippi | Dec. 27, 1949 |
| 2,569,705 | Briggs et al. | Oct. 2, 1951 |

FOREIGN PATENTS

| | | |
|---|---|---|
| 584,579 | France | Feb. 10, 1915 |
| 759,748 | France | Nov. 23, 1933 |